United States Patent [19]

Baker

[11] 4,208,711
[45] Jun. 17, 1980

[54] INVERTER WITH NATURALLY COMMUTATED MIXER

[75] Inventor: Richard H. Baker, Bedford, Mass.

[73] Assignee: Exxon Research & Engineering Co., Florham Park, N.J.

[21] Appl. No.: 972,249

[22] Filed: Dec. 22, 1978

Related U.S. Application Data

[63] Continuation of Ser. No. 886,124, Mar. 13, 1978, abandoned.

[51] Int. Cl.$^2$ .................. H02M 7/515; H02M 1/06
[52] U.S. Cl. .................................. 363/136; 363/43; 363/124; 363/138
[58] Field of Search ................... 363/43, 58–60, 363/96, 124, 135–138; 307/81, 85, 227, 252 M, 264, 265

[56] References Cited

U.S. PATENT DOCUMENTS

| | | | |
|---|---|---|---|
| 3,213,287 | 10/1965 | King | 363/137 X |
| 3,500,170 | 3/1970 | Charrin et al. | 363/136 |
| 3,538,419 | 11/1970 | Seki et al. | 363/138 |
| 3,656,047 | 4/1972 | Yarema et al. | 363/138 |
| 3,694,727 | 9/1972 | Seki | 363/138 |
| 3,781,645 | 12/1973 | Grom et al. | 363/138 |
| 3,932,798 | 1/1976 | Chalmers et al. | 363/138 |
| 3,980,941 | 9/1976 | Griebel | 363/138 |
| 4,117,364 | 9/1978 | Baker | 363/43 |

Primary Examiner—J. D. Miller
Assistant Examiner—Peter S. Wong
Attorney, Agent, or Firm—Kenneth Watov

[57] ABSTRACT

At the initiation of each successive waveform of a train of positive polarity stepped waveforms, a first single-pole-single-throw (SPST) switching circuit is operated for applying this train of waveforms across a fullwave SCR bridge mixer network having individual diodes connected in inverse parallel across each SCR. For alternating ones of the train of waveforms, a different diagonal pair of SCR's of the mixer are turned on at the initiation of an associative waveform, for supplying alternating current to and a dual polarity AC voltage across a load. At the end of the period of each waveform, the first switching circuit is operated for removing the train of waveforms from the mixer, and thereafter a second switching circuit is operated for applying a negative voltage across the mixer network, causing the diodes to become forward biased for reverse biasing their respective SCR's, thereby turning off the conducting ones of the SCR's via natural commutation. More than one diode is connected in a series circuit, and the series combination connected in inverse parallel with each SCR, for substantially reducing the turnoff times of the SCR's. After the SCR's turn off, the second switching circuit is operated for disconnecting the negative voltage from the mixer network prior to the initiation of the next waveform.

12 Claims, 9 Drawing Figures

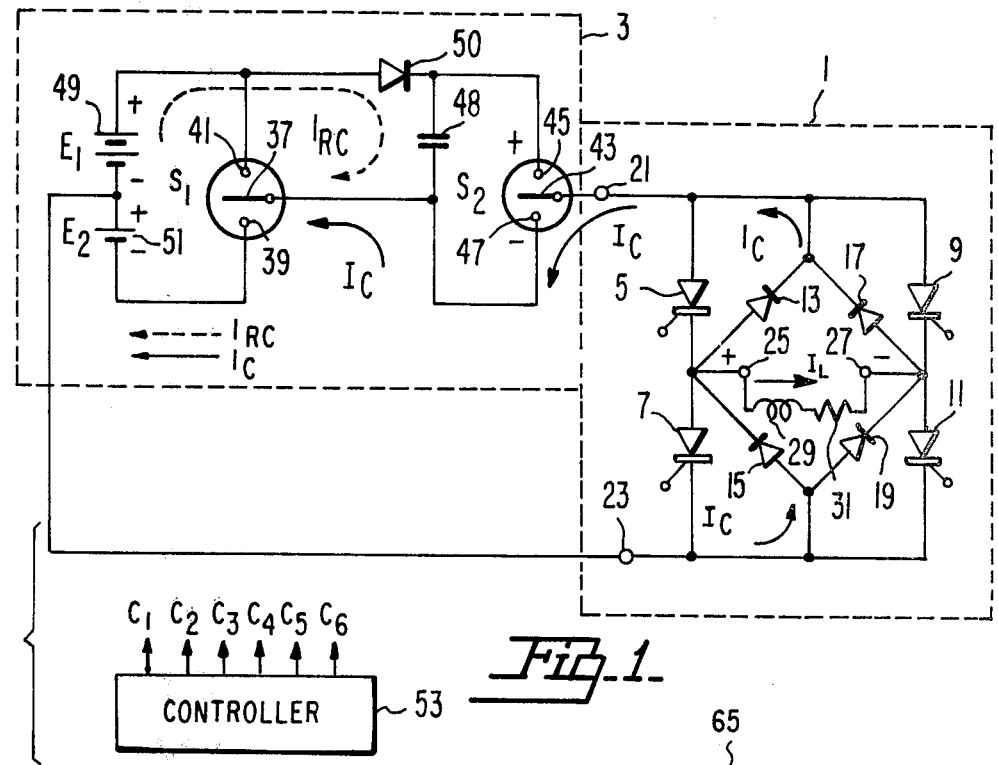
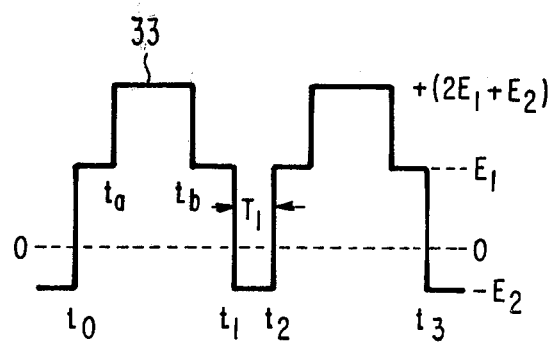
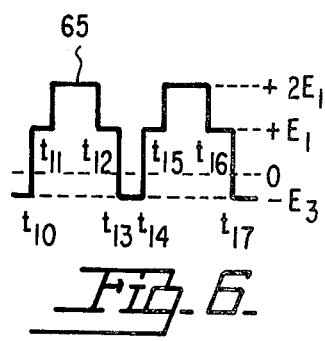
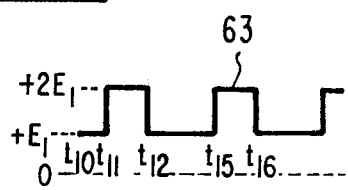
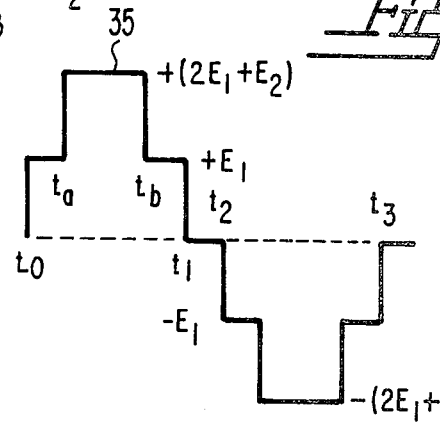

INVERTER WITH NATURALLY COMMUTATED MIXER

This is a continuation of application Ser. No. 886,124, filed Mar. 13, 1978, now abandoned.

The field of the present invention relates generally to inverter circuits and systems, and more specifically to an inverter system including a naturally commutated mixer.

It is known in the prior art to connect four silicon-controlled rectifiers into a full-wave bridge network, connect a constant DC voltage across the bridge network, and alternately turn on and off the diagonal pairs of silicon-controlled rectifiers to convert the DC voltage into an AC voltage between the output terminals of the bridge network. In such bridge-connected SCR mixer circuits, it is common to use what is known as "forced commutation" to turn off the conducting ones of the silicon-controlled rectifiers. Forced commutation techniques require complicated circuitry and additional components for forcing off the silicon-controlled rectifiers, that is for diverting the current away from the main conducting path of the silicon-controlled rectifier. It should be noted that a silicon-controlled rectifier (hereinafter referred to as an SCR) is one of a family of solid-state switching devices known as thyristors. An SCR has an anode electrode, cathode electrode, and a control electrode. In general, when a positive pulse or signal is applied to the control electrode of an SCR, the relative impedance between its anode and cathode electrodes is substantially reduced for permitting the flow of current therebetween. Once turned on, the only ways to turn off an SCR are to either reverse bias its anode-cathode main current path or to reduce the magnitude of current flowing through this conduction path to zero by removing the source of current, or by diverting this flow of current away from the main current path of the SCR. Also included in the family of devices known as thyristors is a gate-turnoff SCR which can be operated in the same manner as a standard SCR, but has the advantage that it can be turned off by applying a large negative current signal at its gate electrode.

In his copending application Ser. No. 686,438, filed May 14, 1976, now U.S. Pat. No. 4,117,364, for "A VOLTAGE WAVEFORM SYNTHESIZER AND A SYSTEM THAT INCLUDES THE SAME", the present inventor recognized as shown in FIG. 2A and described on page 9, lines 10–19, that the SCR's included in a mixer network can be "naturally" commutated from their active to their deactivated condition by substituting for the DC voltage normally applied across the mixer network a train of unipolarity stepped waveforms, which train is referenced to an opposite polarity voltage, whereby during the period of time between waveforms this opposite polarity waveform is applied across the mixer network for forwardbiasing the commutating diodes connected in antiparallel with each SCR, in turn causing a reverse bias voltage (the voltage drop across the diode) to be applied across each one of the SCR's, turning them off. The present invention includes a more simplified circuit for supplying the train of unipolarity waveforms, for applying a reverse bias voltage across the SCR's during the period of time between waveforms, and an improved mixer circuit with additional diodes for increasing the reverse bias voltage across the SCR's, thereby decreasing the turn-off time thereof.

In the drawings, wherein like reference designations indicate like elements:

FIG. 1 is a circuit schematic diagram of an inverter system including natural commutation of a mixer network;

FIG. 2 shows a typical train of waveforms that can be obtained from the level-shifting circuit portion of the inverter of FIG. 1;

FIG. 3 shows the dual polarity AC waveform obtained from the output of the mixer circuit of FIG. 1;

FIG. 5 shows the unipolarity step waveform obtained from the level-shifting circuit portion of FIG. 4;

FIG. 6 shows the train of waveforms applied across the mixer circuit portion of the inverter of FIG. 4;

Figure 4:
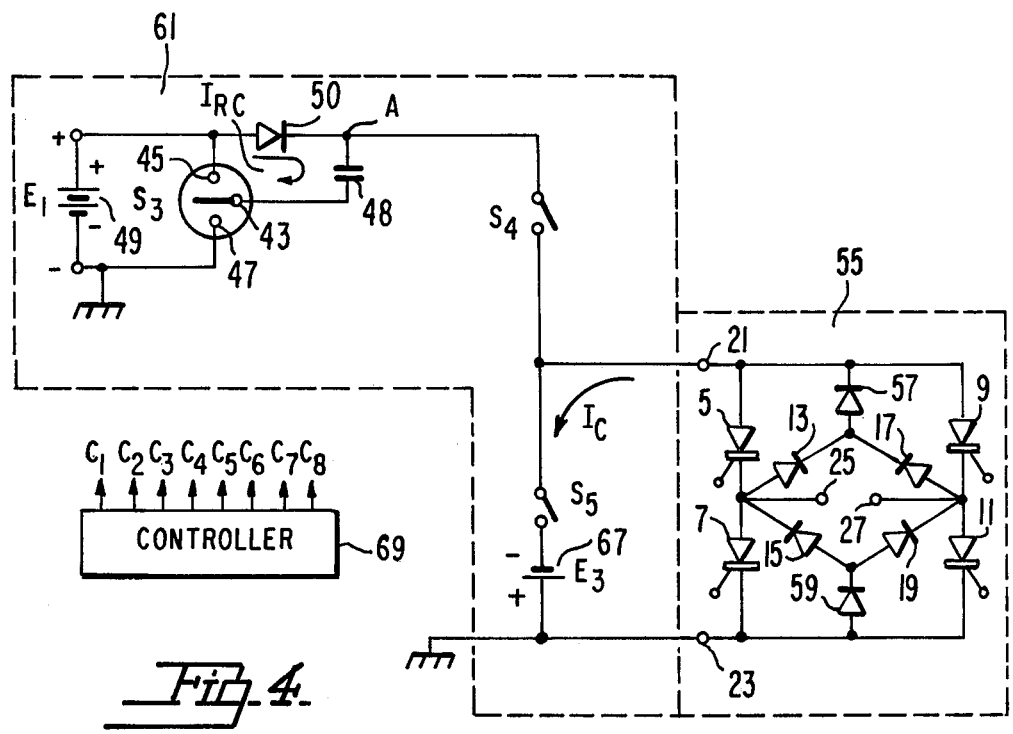
FIG. 4 is a circuit schematic diagram of one embodiment of the inverter system of the present invention.

In FIG. 1, an inverter system includes a mixer circuit 1 and a waveform synthesizer or level-shifting circuit 3. As previously mentioned, a mixer circuit 1 including SCR's 5,7,9,11, connected in a full-wave bridge configuration, with individual diodes 13,15,17 and 19 connected in inverse parallel across the SCR's 5,7,9,11, respectively, a pair of input or operating voltage terminals 21,23, and pair of output terminals 25,27, between which a load impedance 29,31 is connected, is known in the prior art. It is common practice to apply a positive DC voltage to the operating voltage 21, and a reference voltage to the operating voltage terminal 23, whereby the mixer network 1 is operated by alternately and repetitively turning on and off the SCR's in diagonal pairs 5,11 and 7,9, for inverting the DC voltage into a dual polarity AC voltage developed between terminals 25 and 27. In the instance of an inductive load, such as 29,31 being driven by the mixer network, the diodes 13,15, 17,19 are required because the load current will lag the load voltage because of the inductive reactance, causing current to flow even when the voltage reduces to zero volt. The diodes permit this lagging current to continue to flow and reduce to zero, even though the conducting pair of SCR's are force commutated off as this reactive current approaches zero. As described in his copending application, the present inventor recognized that by substituting for the DC voltage initially connected across the operating voltage terminals 21,23 a train of stepped waveforms 33 (see FIG. 2) that goes negative during the time interval $T_1$ between waveforms, the conducting ones of the SCR's 5,7,9,11 are "naturally" commutated off without the need for forced commutation circuitry. Assume that at time $t_0$, a positive-going stepped waveform is initiated as shown in FIG. 2, and the diagonal pair of SCR's 5,11, are turned on, thereby conducting current $I_L$ through the load 29,31 in the direction shown. The SCR's 5,11 continue conducting to produce the positive half-cycle of a dual polarity AC voltage waveform 35 between time $t_0$ and $t_1$ (see FIG. 3). At time $t_1$ the voltage level of the train of waveforms 33 goes negative forward-biasing and causing the conduction of current through the diodes 13,15,17,19, the resultant voltage drops across the diodes 13 and 19 in turn reverse-biasing the SCR's 5,11, respectively, causing these SCR's to turn off. At time $t_2$, the train of waveforms 33 again goes positive and the other diagonal pair of SCR's 7,9 are concurrently turned on, for conducting current through the load 29,31 in the opposite direction, thereby producing the negative half-cycle of the AC voltage waveform 35 between times $t_2$ and $t_3$, completing one full cycle of the synthesized AC waveform 35. At time $t_3$, the input train of waveforms 33 again goes negative, forward-biasing the diodes, the resultant voltage drop across diodes 15,17, causing reverse-biasing of the respective SCR's 7,9, respectively, turning off these SCR's. The aforementioned cycle of operation is repeated for the next two waveforms of the train of waveforms 33 and so on, for producing the AC voltage 35. In this example, the input train of waveforms 33 includes successive stepped waveforms that have levels of voltage from $-E_2$ during the periods of time $t_1$ between positive-going segments of the waveforms, a level of $E_1$ between times $t_0$ and $t_a$, and a level of $+(2E_1+E_2)$ between times $t_a$ and $t_b$, between times $t_b$ and $t_1$ the level returns to $E_1$, and between times $t_1$ to $t_2$ (the period $T_1$) the waveform or train of waveforms is at $-E_2$ volts. As would be known to one skilled in the art, one reason for so shaping the waveforms of the train of waveforms 33 is to more accurately synthesize half-cycles of a sine wave. The shape of the successive waveforms of the train of waveforms 33 is identical to the shape of the waveform just described, as shown in FIG. 2. Accordingly, the output AC voltage or waveform 35 is shaped as shown in FIG. 3 with identical waveshapes for alternating positive and negative half-cycles thereof.

A waveform synthesizer or level-shifting circuit 3 for providing the input train of stepped waveforms 33 is provided by the circuit of FIG. 1. Although shown as mechanical switches, switches $S_1$ and $S_2$ can be provided by solid-state or transistorized switching circuits, as would be known to one skilled in the art. For simplicity of explanation in this example, the switches $S_1$ and $S_2$ are shown as mechanical switches. Typical operation of this synthesizer circuit 3 between the times $t_0$ and $t_2$ will now be described. At time $t_0$, switch $S_1$ is operated to place its pole 37 at its lower contact 39, and switch $S_2$ is operated to place its pole 43 at its upper contact 45, thereby causing $+E_1$ volts to be applied to operating voltage terminal 21 of the mixer network 1, and assuming sufficient time, the capacitor charges to a level where the value of voltage thereacross is equal to the sum of the voltages of the batteries 49,51 ($E_1+E_2$). At time $t_a$ switch $S_1$ is operated to connect its pole 37 to its upper contact 41, effectively connecting the capacitor 48 in series with the battery 49 between input terminals 21,23 of the mixer network 1, thereby applying a level of voltage equal to $+(2E_1+E_2)$. At time $t_b$, switch $S_1$ is operated to return its pole 37 to its lower contact 39, causing the voltage applied to input terminal 21 to reduce to $E_1$. At time $t_1$, switch $S_2$ is operated to connect its pole 43 to its lower contact 47, causing the battery 51 to be connected across the operating voltage terminals 21,23, causing a voltage of $-E_2$ volts to be applied to the operating voltage terminal 21. Such operation of the waveform synthesizer circuit 3 is repetitive for producing the train of input waveforms 33 for application across the input terminals 21,23 of the mixer network 1. Note that the timing of operation and frequency of operation of the switch $S_1$ is such that the diode 50 is forward-biased when the capacitor 48 is taking on charge and $+E_1$ volts is being applied to input terminal 21, and back-biased when the capacitor 48 is connected in series with the battery 49. The controller 53 provides the control signals $C_1$ through $C_6$ for operating the switches $S_1, S_2$ and SCR's 5,7,9,11, respectively. The operation of the controller can be modified for producing a train of waveforms shaped other than shown in FIG. 2, and an AC output waveform shaped other than shown in FIG. 3, as would be clear to one skilled in the art. This controller 53 function can be provided by some combination of digital logic or a microprocessor, for example.

In FIG. 4, an improved inverter system is shown. In a first embodiment of the present invention, two diodes 57,59 have been added to the mixer network 1 for providing an improved mixer network 55, as shown. In effect each one of the SCR's 5,7,9,11 now have two diodes connected in series with one another and the combination in antiparallel across the associative SCR, for increasing the level of the reverse-bias voltage applied across each one of the SCR's by a factor of 2 (about 1.8 volts instead of 0.9 volts) which can substantially decrease the turnoff time of the SCR's 5, 7,9,11 typically by as much as a factor of 4. A decrease in turnoff time is especially important for generating high-speed AC waveforms, and in addition allows the use of slower, less expensive devices in many applications. The diodes 57,59 can be relatively slow speed with relatively low reverse breakdown voltage ratings. Another improvement of the inverter circuit of FIG. 4 over that of FIG. 1, and a second embodiment of the invention, is the manner in which the train of stepped waveforms is generated for application across the input terminals 21,23 of the mixer network 55 as will be described.

Figure 7:
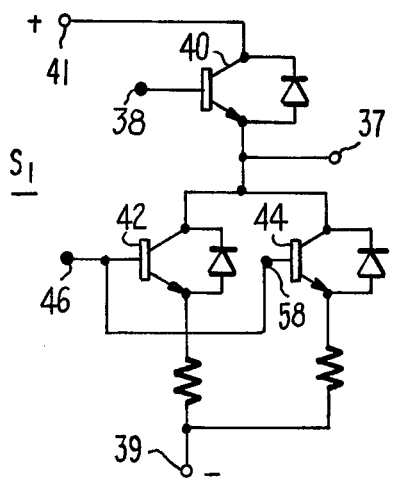
FIG. 7 is a circuit schematic diagram of a transistorized high-current single-pole-double-throw switch.
Figure 8:
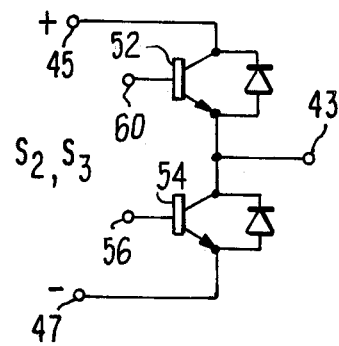
FIG. 8 is a circuit schematic diagram of a relatively low-current transistorized single-pole-double-throw switch.

Assuming that the double-pole-single-throw switch $S_1$ is provided by solid-state transistorized switching circuit as shown in FIG. 7 and the double-pole-single-throw switch $S_2$ is supplied by the transistorized switching circuit of FIG. 8, it would be obvious to one skilled in the art that when a positive voltage is applied to the base electrode 38 of the upper transistor 40 of FIG. 7, a conduction path is established between upper contact 41 and pole terminal 37, with the lower two transistors 42,44 nonconductive and when the upper transistor 40 is nonconductive and a positive signal is applied to the base electrodes 46,58, respectively, of the lower two transistors a conduction path is established between the pole terminal 37 and the lower contact terminal 39. Similarly, in FIG. 8 the functions for the switch $S_2$ are provided by applying a positive signal to the base electrode 60 of the upper transistor 52 with the lower transistor 54 nonconductive for establishing a conduction path between the upper contact terminal 45 and the pole terminal 43, and with the upper transistor nonconductive a positive signal is applied to the base electrode 56 of the lower transistor 54 for establishing a conduction path between the pole terminal 43 and the lower contact terminal 47. The signals for operating the transistors of switches $S_1$ and $S_2$ are of course supplied from the controller 53.

In operating the inverter circuit of FIG. 1, during the time period $T_1$, the path for the commutation current $I_C$, which flows through the diodes 13,15,17,19, includes the collector-emitter current path of the lower transistor switch $S_2$ and the collector-emitter current paths of each one of the two lower transistors of the switch $S_1$. In switch $S_1$, the commutation current $I_C$ is added to the capacitor recharge current $I_{RC}$, necessitating the use of the two transistors 42,44 in the bottom half of the switch $S_1$, or a single power transistor having a very large area on its chip to handle the high currents flowing therethrough, during the turnoff period $T_1$ or commutation period for the SCR's 5, 7, 9, 11. The present inventor recognized that the requirement for either 2 transistors to be connected in parallel in the lower half of the switch $S_1$ or the use of a large area power transistor for handling the combined currents $I_C$ and $I_{RC}$ poses certain economic constraints for applications where relatively high currents are required, and also increases the storage time for the transistor or transistors for the lower half of the switch $S_1$ due to the higher current flowing therethrough. Accordingly, the present invention in another embodiment of this invention, invented a new and different level-shifting circuit 61 for avoiding the aforementioned problems in the level-shifting circuit 3 of FIG. 1. The level-shifting circuit or waveform synthesizer 61 is operable, as will be described, to produce the train of unipolarity stepped waveforms referenced to an opposite polarity voltage as shown in FIG. 6, for application across input terminals 21 and 23 of the mixer circuit 1 of FIG. 1, or the improved mixer circuit 55 of FIG. 4.

The operation of the inverter system of FIG. 4 will now be described, with reference also to FIGS. 5 and 6. The train of unipolarity waveforms referenced to zero volt is produced at point A by operating the double-pole-single-throw switch $S_3$ to have its pole 43 connected to its lower contact 47 for producing a voltage having a level of $+E_1$ volts at point A, at which times recharge current $I_{RC}$ flows through the diode 50 and capacitor 48 and switch $S_3$ from the battery 49. The switch $S_3$ is operated to connect its pole 43 to its upper contact 45 for connecting the capacitor 48 in series with the battery 49 for changing the level of voltage at point A from $+E_1$ volts to $+2E_1$ volts. Accordingly, the unipolarity waveform 63 of FIG. 5 is produced by operating switch $S_3$ to have its pole 43 connected to its lower contact 47 during the periods of time between $t_{10}$ to $t_{11}$, $t_{12}$ to $t_{15}$, and its pole 43 is connected to its upper contact 45 between times $t_{11}$ to $t_{12}$, and $t_{15}$ to $t_{16}$, for example. The waveform 65 of FIG. 6 is produced across the input terminals 21, 23 of the mixer circuit 55 by operating the single-pole-double-throw switches $S_4$ and $S_5$ to their closed and open positions, respectively, for the periods of time between $t_{10}$ to $t_{13}$, and $t_{14}$ to $t_{17}$, and to their open and closed conditions, respectively, for the period of time between times $t_{13}$ to $t_{14}$. The switches $S_4$ and $S_5$ are never operated to their closed conditions simultaneously; therefore, as would be obvious to one skilled in the art, the two switches $S_4$ and $S_5$ can also be combined and shown as a single-pole-double-throw switch, the function of which can be provided by the transistorized switching circuit of FIG. 8. It is important to note that for the periods of time that the train of waveforms 65 are at their reference level of $-E_3$ volts (switch $S_5$ closed), the commutating current $I_C$ passes only through the switch $S_5$ and the battery 67 supplying the voltage $-E_3$. Accordingly, the current flowing through the lower transistor of switch $S_3$ is reduced to about half that flowing through the lower transistor(s) of the switch $S_1$ during the commutating time for the SCR's 5,7,9,11. Therefore, the chip area required for the lower transistor of switch $S_3$ is substantially reduced in comparison to the area required for the lower transistor chip of the switch $S_1$. Also, it is likely that the storage time in the lower transistor(s) of switch $S_1$, because it is handling twice the current of the lower transistor in the switch $S_3$, will be greater than the storage time of the lower transistor of switch $S_3$, whereby the turnoff time of the lower transistor of switch $S_3$ should be less than the turnoff time of the lower transistorized switching portion of the switch $S_1$, enhancing the high-frequency operation of the level-shifting circuit. Another advantage of the level-shifting circuit 61 of FIG. 4 in comparison to the level-shifting circuit 3 of FIG. 1, is that the battery 67 can have a voltage level $E_3$ equal to about half the voltage level $E_2$ of the battery 51, because the bias voltage $E_3$ does not have to overcome the voltage drops due to the passage of the commutating current and capacitor recharge current through more than one switch (transistor) as in the level-shifting circuit 3. As a result, the commutation power required for the level-shifting circuit 61 is less than half that required for the level-shifting circuit 3, and the commutation current for the former can be set at a different limit than the forward current supplied to the conducting ones of the SCR's 5,7,9,11. The controller 69 provides the necessary control signals, such as $C_1$ through $C_8$ for operating the transistorized switches $S_3$, $S_4$, $S_5$ and the thyristors 5,7,9,11.

Figure 9:
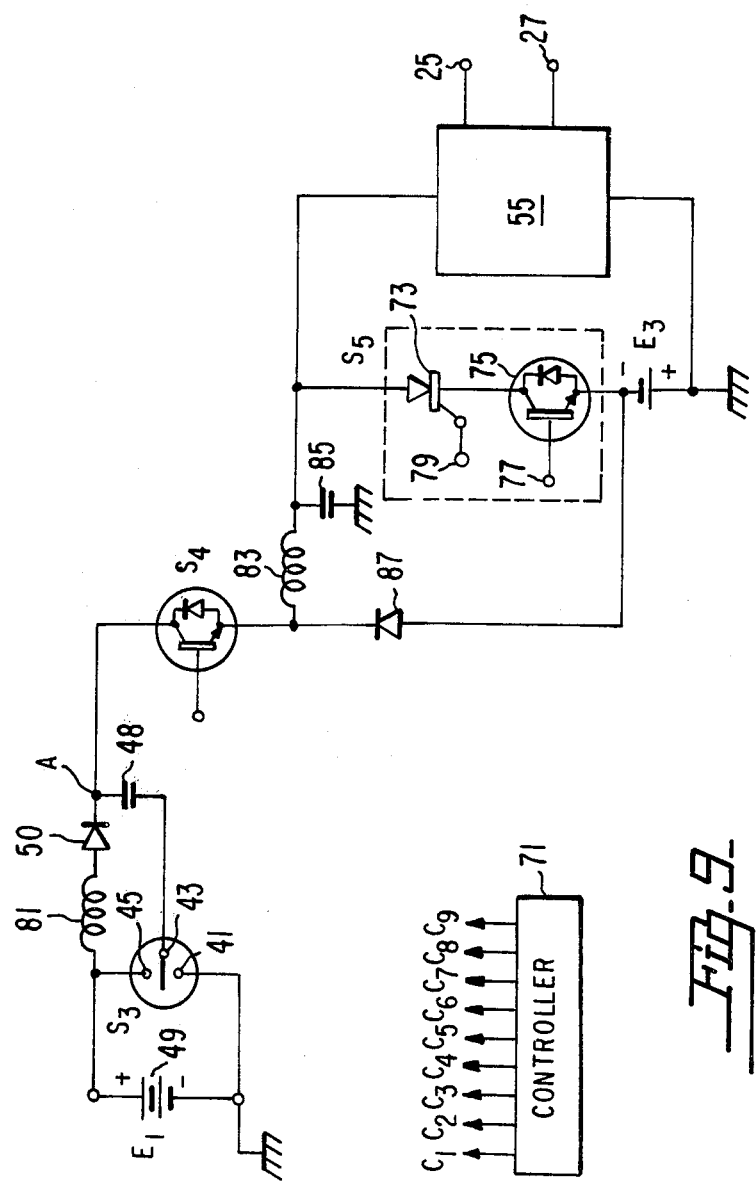
FIG. 9 is a circuit schematic diagram of a high-voltage inverter system.

In FIG. 9, the inverter system of FIG. 4 is shown in a configuration for high voltage applications where the level $E_1$ of the battery 49 is greater than that which can be handled by presently available transistors (about 600 volts). For this application, the controller 71 is programmed for providing control signals $C_1$ through $C_9$ for operating the transistors of switches $S_3$, $S_4$ and $S_5$, the thyristor 73 and the thyristors 5,7,9, and 11 of the mixer network 55 (this mixer network can also be the mixer network 1 of FIG. 1), respectively. The controller 71 is programmed to apply signals to the inverter system such that the transistor switch $S_4$ is turned on at substantially the same time that the voltage at point A goes from $+E_1$ volts to $+2E_1$ volts, say from 600 volts to 1200 volts. Accordingly, the transistor used for providing the switch $S_4$ can be a 600 volt power transistor, which with present technology is available. In other words, the switch $S_4$ will never have more than 600 volts applied across it because at times that this switch is turned off, point A will never be allowed to go higher than 600 volts, in this example. Unfortunately, this is not the case for the lower switch $S_5$, which can have up to $+2E_1$ volts applied across it, up to 1200 volts in this example. With present technology 1200 volt transistors are not readily available, and in any case would be economically prohibitive for most applications. To avoid this problem, a high-voltage SCR 73 is connected in series with a relatively low-voltage power transistor 75, as shown to provide the switching function of switch $S_5$ in an economical manner. High-voltage SCR's are readily available and are relatively inexpensive. In operating the switch $S_5$, control signal $C_5$ is applied to the base electrode terminal 77 of transistor 75 to turn on this transistor, and immediately thereafter the control signal $C_4$ is applied to the gate electrode terminal 79 of the thyristor 73 to turn on this thyristor, thereby turning on the switch $S_5$ at appropriate times. An inductor 81 has been added for integrating the current flow from point A, and the combination of the inductor 83 and capacitor 85 serve to filter the waveforms of a train of waveforms applied to the mixer network 55. The diode 87 is a free-wheeling diode for providing current to the inductor 83.

What is claimed is:

1. A system for inverting a first DC voltage into a dual polarity AC voltage comprising:
   a mixer network including:
      first and second input terminals, said second input terminal being connected to a point of reference potential; first and second output terminals for connection to a load; first and second thyristors having their anodes connected in common to said first input terminal, and their cathodes to said first and second output terminals, respectively; third and fourth thyristors having their anodes connected to said first and second output terminals, respectively, and their cathodes connected in common to said second input terminal; and a plurality of diodes, at least individual pairs of which are connected in a series circuit with one another and such series circuit in inverse parallel across the anode-cathode electrodes of said first through fourth thyristors, respectively;
   means for level shifting said DC voltage into a train of positive polarity stepped waveforms;
   DC voltage supply means for providing a second DC voltage of negative polarity;
   switching means receptive of said train of unipolarity stepped waveforms, and of said second DC voltage, said switching means being operable to a first condition for applying only said train of waveforms to said first input terminal, and to a second condition for applying only said second DC voltage to said first input terminal; and
   controller means for operating said switching means to its first condition at the initiation of the period of occurrence of one of said stepped waveforms of said train of waveforms, concurrent with operating said first and fourth thyristors to their conductive states for applying current to said load in one direction, said controller means operating said switching means to its second condition at the end of the period of occurrence of the stepped waveform, whereby said plurality of diodes are forward-biased by said second DC voltage, and the resultant voltage drop across each pair of series connected diodes causes their respective thyristor to be reverse-biased, thereby turning off said first and fourth thyristors, said controller means thereafter operating said switching means to its first condition at the initiation of the next occurring stepped waveform, concurrent with operating said second and third thyristors to their conductive states for applying current to said load in the opposite direction, said controller means again operating said switching means to its second condition at the end of the period of occurrence of the associated stepped waveform, thereby reverse-biasing and turning off said second and third thyristors, said controller means repetitively operating said switching means and said first through fourth thyristors in the above manner for producing said dual polarity AC voltage across said load.

2. The inverter system of claim 1, wherein said plurality of diodes includes:
   first and second diodes connected in series, and the series combination thereof in inverse parallel across said first thyristor;
   a third diode having a cathode electrode connected to the common connection of said first and second diodes, and an anode electrode connected to the cathode electrode of said second thyristor;
   fourth and fifth diodes connected in series, and the series combination thereof in inverse parallel across said third thyristor; and
   a sixth diode having an anode electrode connected to the common connection of said fourth and fifth diodes, and a cathode electrode connected to the anode electrode of said fourth thyristor.

3. The inverter system of claim 1, wherein said switching means includes:
   first single-pole-single-throw (SPST) switch means having a pole receptive of said train of positive polarity stepped waveforms, and a contact connected to said first input terminal of said mixer network, said first SPST switch means being selectively operable to either a closed state in which its pole is connected to its contact, or to an open state in which its pole is disconnected from its contact; and
   second SPST switch means having a pole connected to said first input terminal, and a contact receptive of said second DC voltage, said second SPST switch means being selectively operable as said first SPST switch means to either one of an open or closed state;
   the first condition of said switching means being established when said first and second SPST switch means are operated to their closed and open states, respectively, and the second condition of said switching means being established when said first and second SPST switch means are operated to their open and closed states, respectively.

4. An inverter system comprising:
   first and second input terminals, said second input terminal being connected to a point of reference potential;
   first and second output terminals;
   first through fourth silicon controlled rectifiers each having an anode, cathode, and control electrodes, each being commonly known as an SCR, said first and second SCR's having their respective anode electrodes connected in common to said first input terminal, and their cathode electrodes connected to said first and second output terminals, respectively, said third and fourth SCR's having their respective cathode electrodes connected in common to said second input terminal, and their anode electrodes connected to said first and second output terminals, respectively;
   first through fourth diodes connected in antiparallel across the anode and cathode electrodes of said first through fourth SCR's, respectively;
   level-shifting means operable for converting a DC voltage into a train of unipolarity stepped waveforms with steps from $+E_1$ to $+E_2$ volts;
   first switching means receptive of said train of unipolarity stepped waveforms, and operable to a first condition for applying said train of waveforms to said first input terminal, and to a second condition for removing said train of waveforms from said first input terminal;
   DC voltage supply means having a positive terminal connected to said second input terminal, and a negative terminal, for producing $-E_3$ volts;
   second switching means operable to a first condition for closing a current conduction path between said first input terminal and the negative terminal of said DC voltage supply means, and to a second condition for opening this current conduction path; and controller means for simultaneously operating (1) said level shifting means to produce said train of unipolarity stepped waveforms, (2) said first and second switching means to their first and second conditions, respectively, for a first period of time, and to their second and first conditions, respectively, for a second period of time, in a repetitive manner, the first and second periods of time being predetermined for effectively applying to said first input terminal a train of stepped waveforms each having steps $+E_1$ and $+E_2$ volts during different portions of said first period of time, with the level between waveforms being $-E_3$ volts during said second period of time, and (3) applying control signals to the control electrodes of said first and fourth SCR's for turning on these SCR's at the initiation of one of the first periods of time, and applying control signals to the control electrodes of said second and third SCR's for turning on these SCR's at the initiation of the next first period of time, the conducting ones of said first through fourth SCR's being "naturally" commutated off during said second periods of time via said first through fourth diodes becoming forward-biased and conducting current with the resultant voltage drop across each diode reverse-biasing their respective SCR, thereby producing a train of dual-polarity stepped waveforms across said output terminals.

5. The inverter system of claim 4, further including: fifth and sixth diodes, said first through sixth diodes each having an anode and cathode electrodes, said first and second diodes having their cathode electrodes connected in common to the anode electrode of said fifth diode, and their anode electrodes to the cathode electrodes of said first and second SCR's, respectively, said fifth diode having its cathode electrode connected to said first input terminal, said third and fourth diodes having their anode electrodes connected in common to the cathode electrode of said sixth diode, and their cathode electrodes to the anode electrodes of said third and fourth SCR's, respectively, said sixth diode having its anode electrode connected to said second input terminal, whereby the addition of said fifth diode substantially reduces the turn-off times of said first and second SCR's, and the addition of said sixth diode substantially reduces the turn-off times of said third and fourth SCR's.

6. The inverter system of claim 4, wherein said level shifting means includes:
DC voltage supply means having a positive terminal, and a negative terminal connected to said point of reference potential, for providing $+E_1$ volts at said positive terminal;
a diode having an anode electrode connected to said positive terminal, and a cathode electrode;
a capacitor having one end connected to the cathode electrode of said fifth diode;
single-pole-double-throw (SPDT) switching means having a pole connected to the other end of said capacitor, an upper contact connected to said positive terminal, and a lower contact to said point of reference potential, and SPSDT switching means being repetitively and alternately operable between first and second conditions where its pole is connected to its lower and upper contacts, respectively, for in the first condition charging said capacitor to about $+E_1$ volts, producing at the common connection between said capacitor and said diode a voltage level of about $+E_1$ volts, and for in the second condition connecting said capacitor in its charged state in series with said DC voltage supply means, for producing a voltage level of about $+2E_1$ volts equal to $+E_2$ volts at the common connection of said diode and capacitor, thereby producing said train of unipolarity stepped waveforms.

7. A system for inverting a first DC voltage into a dual polarity AC voltage comprising:
a mixer network including:
first and second input terminals, said second input terminal being connected to a point of reference potential; first and second output terminals for connection to a load; first and second thyristors having their anodes connected in common to said first input terminal, and their cathodes to said first and second output terminals, respectively; third and fourth thyristors having their anodes connected to said first and second output terminals, respectively, and their cathodes connected in common to said second input terminal; and a plurality of diodes, at least individual pairs of which are connected in a series circuit with one another and such series circuit in inverse parallel across the anode-cathode electrodes of said first through fourth thyristors, respectively;
means for level shifting said first DC voltage into a train of positive polarity stepped waveforms;
switching means receptive of said train of unipolarity stepped waveforms, and of a second DC voltage, said switching means being operable to a first condition for applying only said train of waveforms to said first input terminal, and to a second condition for applying only said second DC voltage to said first input terminal; and
controller means for operating said switching means to its first condition at the initiation of the period of occurrence of one of said stepped waveforms of said train of waveforms, concurrent with operating said first and fourth thyristors to their conductive states for applying current to said load in one direction, said controller means operating said switching means to its second condition at the end of the period of occurrence of the stepped waveform, whereby said plurality of diodes are forward-biased by said second DC voltage, and the resultant voltage drop across each pair of series connected diodes causes their respective thyristor to be reverse-biased, thereby turning off said first and fourth thyristors, said controller means thereafter operating said switching means to its first condition at the initiation of the next occurring stepped waveform, concurrent with operating said second and third thyristors to their conductive states for applying current to said load in the opposite direction, said controller means again operating said switching means to its second condition at the end of the period of occurrence of the associated stepped waveform, thereby reverse-biasing and turning off said second and third thyristors, said controller means repetitively operating said switching means and said first through fourth thyristors in the above manner for producing said dual polarity AC voltage across said load.

8. The inverter system of claim 7, wherein said plurality of diodes includes:
first and second diodes connected in series, and the series combination thereof in inverse parallel across said first thyristor;
a third diode having a cathode electrode connected to the common connection of said first and second diodes, and an anode electrode connected to the cathode electrode of said second thyristor;
fourth and fifth diodes connected in series, and the series combination thereof in inverse parallel across said third thyristor; and
a sixth diode having an anode electrode connected to the common connection of said fourth and fifth diodes, and a cathode electrode connected to the anode electrode of said fourth thyristor.

9. The inverter system of claim 7, wherein said switching means includes:
first single-pole-single-throw (SPST) switch means having a pole receptive of said train of positive polarity stepped waveforms, and a contact connected to said first input terminal of said mixer network, said first SPST switch means being selectively operable to either a closed state in which its pole is connected to its contact, or to an open state in which its pole is disconnected from its contact; and
second SPST switch means having a pole connected to said first input terminal, and a contact receptive of said second DC voltage, said second SPST switch means being selectively operable as said first SPST switch means to either one of an open or closed state;
the first condition of said switching means being established when said first and second SPST switch means are operated to their closed and open states, respectively, and the second condition of said switching means being established when said first and second SPST switch means are operated to their open and closed states, respectively.

10. An inverter system comprising:
first and second input terminals, said second input terminal being connected to a point of reference potential;
first and second output terminals;
first through fourth silicon controlled rectifiers each having an anode, cathode, and control electrodes, each being commonly known as an SCR, said first and second SCR's having their respective anode electrodes connected in common to said first input terminal, and their cathode electrodes connected to said first and second output terminals, respectively, said third and fourth SCR's having their respective cathode electrodes connected in common to said second input terminal, and their anode electrodes connected to said first and second output terminals, respectively;
first through fourth diodes connected in antiparallel across the anode and cathode electrodes of said first through fourth SCR's respectively;
level-shifting means operable for converting a first DC voltage into a train of unipolarity stepped waveforms with steps from $+E_1$ to $+E_2$ volts;
first switching means receptive of said train of unipolarity stepped waveforms, and operable to a first condition for applying said train of waveforms to said first input terminal, and to a second condition for removing said train of waveforms from said first input terminal;
second switching means receptive of a second DC voltage having a level of $-E_3$ volts, operable to a first condition for applying this second DC voltage to said first input terminal, and to a second condition for removing the second DC voltage from said first input terminal; and
controller means for simultaneously operating (1) said level shifting means to produce said train of unipolarity stepped waveforms, (2) said first and second switching means to their first and second conditions, respectively, for a first period of time, and to their second and first conditions, respectively, for a second period of time, in a repetitive manner, the first and second periods of time being predetermined for effectively applying to said first input terminal a train of stepped waveforms each having steps of $+E_1$ and $+E_2$ volts during different portions of said first period of time, with the level between waveforms being $-E_3$ volts during said second period of time, and (3) applying control signals to the control electrodes of said first and fourth SCR's for turning on these SCR's at the initiation of one of the first periods of time, and applying control signals to the control electrodes of said second and third SCR's for turning on these SCR's at the initiation of the next first period of time, the conducting ones of said first through fourth SCR's being "naturally" commutated off during said second periods of time via said first through fourth diodes becoming forward-biased and conducting current with the resultant voltage drop across each diode reverse-biasing their respective SCR, thereby producing a train of dual-polarity stepped waveforms across said output terminals.

11. The inverter system of claim 10, further including:
fifth and sixth diodes, said first through sixth diodes each having an anode and cathode electrodes, said first and second diodes having their cathode electrodes connected in common to the anode electrode of said fifth diode, and their anode electrodes to the cathode electrodes of said first and second SCR's, respectively, said fifth diode having its cathode electrode connected to said first input terminal, said third and fourth diodes having their anode electrodes connected in common to the cathode electrode of said sixth diode, and their cathode electrodes to the anode electrodes of said third and fourth SCR's, respectively, said sixth diode having its anode electrode connected to said second input terminal, whereby the addition of said fifth diode substantially reduces the turnoff times of said first and second SCR's, and the addition of said sixth diode substantially reduces the turnoff times of said third and fourth SCR's.

12. The inverter system of claim 10, wherein said level shifting means includes:
positive and negative operating voltage terminals, for receiving said first DC voltage having a level of $+E_1$ volts and connection to said point of reference voltage, respectively;
a diode having an anode electrode connected to said positive terminal, and a cathode electrode;
a capacitor having one end connected to the cathode electrode of said fifth diode; and single-pole-double-throw (SPDT) switching means having a pole connected to the other end of said capacitor, an upper contact connected to said positive terminal, and a lower contact to said point of reference potential, said SPSDT switching means being repetitively and alternately operable between first and second conditions where its pole is connected to its lower and upper contacts, respectively, for in the first condition charging said capacitor to about $+E_1$ volts, producing at the common connection between said capacitor and said diode a voltage level of about $+E_1$ volts, and for in the second condition connecting said capacitor in its charged state in series with said DC voltage supply means, for producing a voltage level of about $+2E_1$ volts equal to $+E_2$ volts at the common connection of said diode and capacitor, thereby producing said train of unipolarity stepped waveforms.

* * * * *